(12) United States Patent
Kokubo

(10) Patent No.: US 8,641,575 B2
(45) Date of Patent: Feb. 4, 2014

(54) DRIVING FORCE TRANSMISSION APPARATUS AND VEHICLE

(75) Inventor: Naoyuki Kokubo, Nukata-gun (JP)

(73) Assignee: JTEKT Corporation, Osaka-shi (JP)

( * ) Notice: Subject to any disclaimer, the term of this patent is extended or adjusted under 35 U.S.C. 154(b) by 219 days.

(21) Appl. No.: 13/220,155

(22) Filed: Aug. 29, 2011

(65) Prior Publication Data

US 2012/0048062 A1    Mar. 1, 2012

(30) Foreign Application Priority Data

Aug. 30, 2010  (JP) ................... 2010-192462
Oct. 5, 2010   (JP) ................... 2010-225905

(51) Int. Cl.
*F16H 48/20* (2012.01)

(52) U.S. Cl.
USPC ........................................................ 475/249

(58) Field of Classification Search
USPC .................. 475/249, 220, 223, 224; 74/665 F
See application file for complete search history.

(56) References Cited

U.S. PATENT DOCUMENTS

| | | | | |
|---|---|---|---|---|
| 2,879,867 A * | 3/1959 | Rike | ............... | 188/264 F |
| 4,468,981 A * | 9/1984 | Ries | ............... | 475/225 |
| 5,326,333 A * | 7/1994 | Niizawa et al. | ............... | 475/249 |
| 5,899,306 A | 5/1999 | Arai et al. | | |
| 5,954,173 A | 9/1999 | Ashida et al. | | |
| 6,345,712 B1 * | 2/2002 | Dewald et al. | ............... | 192/221 |
| 6,543,594 B1 | 4/2003 | Führer | | |
| 7,144,347 B2 * | 12/2006 | Kushino | ............... | 475/249 |
| 7,276,010 B2 * | 10/2007 | Kushino | ............... | 475/249 |
| 7,694,791 B2 * | 4/2010 | Kani et al. | ............... | 192/35 |
| 7,717,818 B2 * | 5/2010 | Suzuki et al. | ............... | 475/150 |
| 7,849,988 B2 | 12/2010 | Suzuki et al. | | |
| 2002/0108833 A1 | 8/2002 | Bonser | | |
| 2006/0014602 A1 * | 1/2006 | Sayama | ............... | 475/231 |
| 2006/0046890 A1 * | 3/2006 | Aikawa | ............... | 475/231 |
| 2007/0045075 A1 | 3/2007 | Kani et al. | | |
| 2008/0296082 A1 | 12/2008 | Ogasawara et al. | | |

FOREIGN PATENT DOCUMENTS

| | | |
|---|---|---|
| DE | 198 31 503 A1 | 1/2000 |
| EP | 1 205 681 A2 | 5/2002 |
| EP | 1 760 348 A2 | 3/2007 |
| JP | 2006-200748 | 8/2006 |

OTHER PUBLICATIONS

Extended European Search Report issued Dec. 21, 2011, in Patent Application No. 11179167.9.
Office Action issued Feb. 12, 2013 in European Patent Application No. 11 179 167.9.

* cited by examiner

*Primary Examiner* — David D Le
*Assistant Examiner* — David J Hlavka
(74) *Attorney, Agent, or Firm* — Oblon, Spivak, McClelland, Maier & Neustadt, L.L.P.

(57) ABSTRACT

A driving force transmission apparatus includes: a front housing and an inner shaft coaxially with each other and rotatable relative to each other; a main clutch transmitting torque between the front housing and the inner shaft; and a cam mechanism having a main cam and a pilot cam and using the main cam to press the main clutch. Where a circumferential gap angle between each spline tooth of the front housing and a corresponding first protrusion of outer clutch plates is $\theta_1$, a circumferential gap angle between each spline tooth of the inner shaft and a corresponding protrusion of inner clutch plates is $\theta_2$ and a circumferential gap angle between each spline tooth of the inner shaft and a corresponding protrusion of the main cam is $\theta_3$, the inequality $\theta_1+\theta_2-\theta_3 \geq 1.0°$ is satisfied.

4 Claims, 9 Drawing Sheets

DRIVING FORCE TRANSMISSION APPARATUS AND VEHICLE

INCORPORATION BY REFERENCE

The disclosure of Japanese Patent Applications No. 2010-192462 filed on Aug. 30, 2010 and No. 2010-225905 filed on Oct. 5, 2010, including the specification, drawings and abstract, is incorporated herein by reference in its entirety.

BACKGROUND OF THE INVENTION

1. Field of the Invention

The invention relates to a driving force transmission apparatus and a vehicle equipped with a driving force transmission apparatus.

2. Description of Related Art

In an existing art, there is known a driving force transmission apparatus for a vehicle, which includes an outer rotating member, an inner rotating member that is located coaxially with the outer rotating member and that is rotatable relative to the outer rotating member, a clutch that is formed of outer clutch plates spline-fitted to the outer rotating member and inner clutch plates spline-fitted to the inner rotating member, and a cam mechanism that presses the clutch (see, for example, Japanese Patent No. 4192955).

In the driving force transmission apparatus described in Japanese Patent No. 4192955, in order to suppress abnormal noise that occurs when differential rotation between the outer rotating member and the inner rotating member is reversed, a first spline gap (L1) between a second cam member of the cam mechanism that presses the clutch and the inner rotating member is set smaller than a second spline gap (L2) between the inner clutch plates and the inner rotating member. With the thus configured driving force transmission apparatus, a residual amount of cam thrust is reduced immediately before the inner clutch plates and the outer clutch plates respectively contact tooth flanks of spline teeth of the inner rotating member and outer rotating member on the opposite side in the circumferential direction due to reversal of differential rotation. As a result, generation of abnormal noise is suppressed.

However, in the driving force transmission apparatus described in Japanese Patent No. 4192955, in order to set the first spline gap (L1) smaller than the second spline gap (L2), it is necessary to set the circumferential width of each protrusion of the inner clutch plates spline-fitted to the inner rotating member to a value smaller than at least the circumferential width of each protrusion of the second cam member. Therefore, it is difficult to ensure the load bearing of the inner clutch plates, and the torque transmission capacity of the clutch may be limited.

SUMMARY OF THE INVENTION

It is an object of the invention to provide a driving force transmission apparatus and a vehicle in which generation of abnormal noise is suppressed even when the circumferential width of each protrusion of inner clutch plates spline-fitted to an inner rotating member is not smaller than the circumferential width of each protrusion of a pressing member for pressing a clutch spline-fitted to the inner rotating member.

An aspect of the invention relates to a driving force transmission apparatus, including an outer rotating member, an inner rotating member, a plurality of outer friction plates, a plurality of inner friction plates, and a pressing member. The outer rotating member has a plurality of first spline teeth on its inner peripheral surface, the first spline teeth extending in a direction of a rotation axis. The inner rotating member is provided radially inward of the outer rotating member, is supported coaxially with the outer rotating member so as to be rotatable relative to the outer rotating member, and has a plurality of second spline teeth on its outer peripheral surface, the second spline teeth extending in the direction of the rotation axis. The outer friction plates each has a plurality of first protrusions at its outer peripheral portion, the first protrusions engaging with the first spline teeth. The inner friction plates are arranged alternately with the outer friction plates, and each of the inner friction plates has a plurality of second protrusions at its inner peripheral portion, the second protrusions engaging with the second spline teeth. The pressing member is arranged on one axial side of the outer friction plates and the inner friction plates, has a plurality of third protrusions at its inner peripheral portion, the third protrusions engaging with the second spline teeth, and axially moves along the second spline teeth to press the outer friction plates and the inner friction plates to thereby frictionally engage the outer friction plates with the inner friction plates. Where a gap angle in a circumferential direction between each of the first spline teeth of the outer rotating member and a corresponding one of the first protrusions of the outer friction plates is $\theta_1$, a gap angle in the circumferential direction between each of the second spline teeth of the inner rotating member and a corresponding one of the second protrusions of the inner friction plates is $\theta_2$ and a gap angle in the circumferential direction between each of the second spline teeth of the inner rotating member and a corresponding one of the third protrusions of the pressing member is $\theta_3$, the inequality, $\theta_1+\theta_2-\theta_3 \geq 1.0°$, is satisfied.

According to the aspect of the invention, it is possible to suppress generation of abnormal noise even when the circumferential width of each protrusion of the inner clutch plates spline-fitted to the inner rotating member is not smaller than the circumferential width of each protrusion of a second cam member.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3A shows the appearance of each inner clutch plate and FIG. 3B shows the appearance of each outer clutch plate;

FIG. 4A to FIG. 4C are views that illustrate engagement portions, at which an inner shaft and a front housing are engaged and which are at the inner peripheral portion and outer peripheral portion of a main clutch, in cross sections that are perpendicular to a rotation axis, wherein FIG. 4A shows an engagement portion at which the inner shaft is engaged with a main cam, FIG. 4B shows an engagement portion at which the inner shaft is engaged with the inner clutch plates, and FIG. 4C shows an engagement portion at which the front housing is engaged with the outer clutch plates;

FIG. 5A shows a steady state, FIG. 5B shows an initial reverse state, and FIG. 5C shows a state in which differential rotation is further reversed from the initial reverse state;

FIG. 6A shows the results when the driving force transmission apparatus according to the embodiment is used, and FIG. 6B shows the results when a driving force transmission apparatus according to a comparative example is used;

DETAILED DESCRIPTION OF EMBODIMENTS

Figure 1:
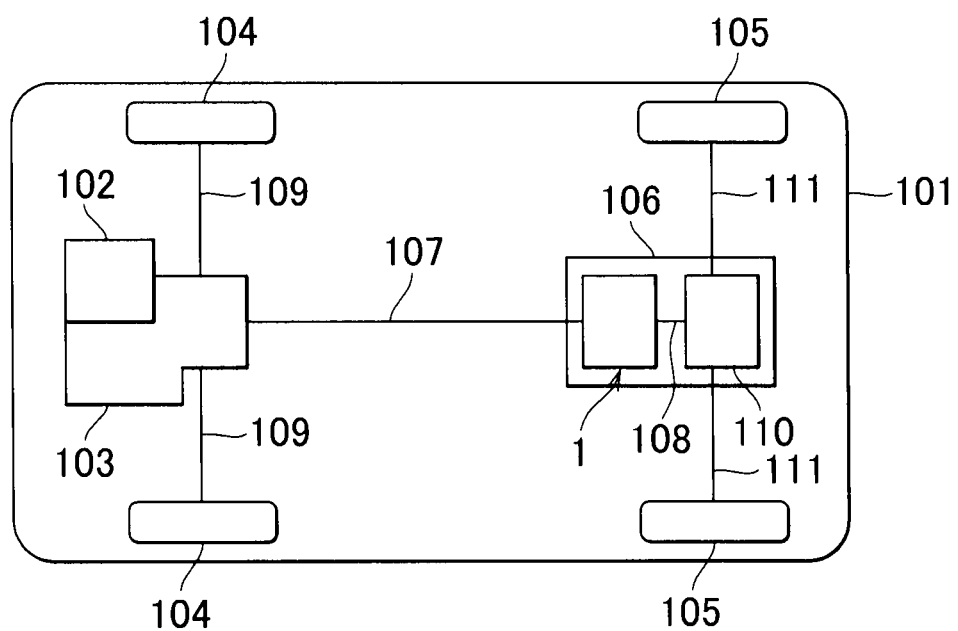
FIG. 1 is a schematic view that shows the configuration of a four-wheel drive vehicle according to a first embodiment of the invention.

FIG. 1 is a schematic view that shows the configuration of a four-wheel drive vehicle 101 according to a first embodiment of the invention. As shown in FIG. 1, the four-wheel drive vehicle 101 includes a driving force transmission apparatus 1, an engine 102 that serves as a driving source, a transaxle 103, a pair of front wheels 104, and a pair of rear wheels 105.

The driving force transmission apparatus 1 is arranged in a driving force transmission path extending from the front wheels to the rear wheels in the four-wheel drive vehicle 101, and is supported by a vehicle body (not shown) of the four-wheel drive vehicle 101 via a differential carrier 106.

The driving force transmission apparatus 1 couples a propeller shaft 107 to a drive pinion shaft 108 such that torque is transmittable, and is configured to be able to transmit the driving force from the engine 102 to the rear wheels 105 when the propeller shaft 107 and the drive pinion shaft 108 are coupled to each other. The details of the driving force transmission apparatus 1 will be described later.

The engine 102 outputs the driving force to front axle shafts 109 via the transaxle 103 to thereby drive the front wheels 104.

The engine 102 outputs the driving force to the propeller shaft 107, the driving force transmission apparatus 1, the drive pinion shaft 108, a rear differential 110 and rear axle shafts 111 via the transaxle 103 to thereby drive the rear wheels 105.

Figure 2:
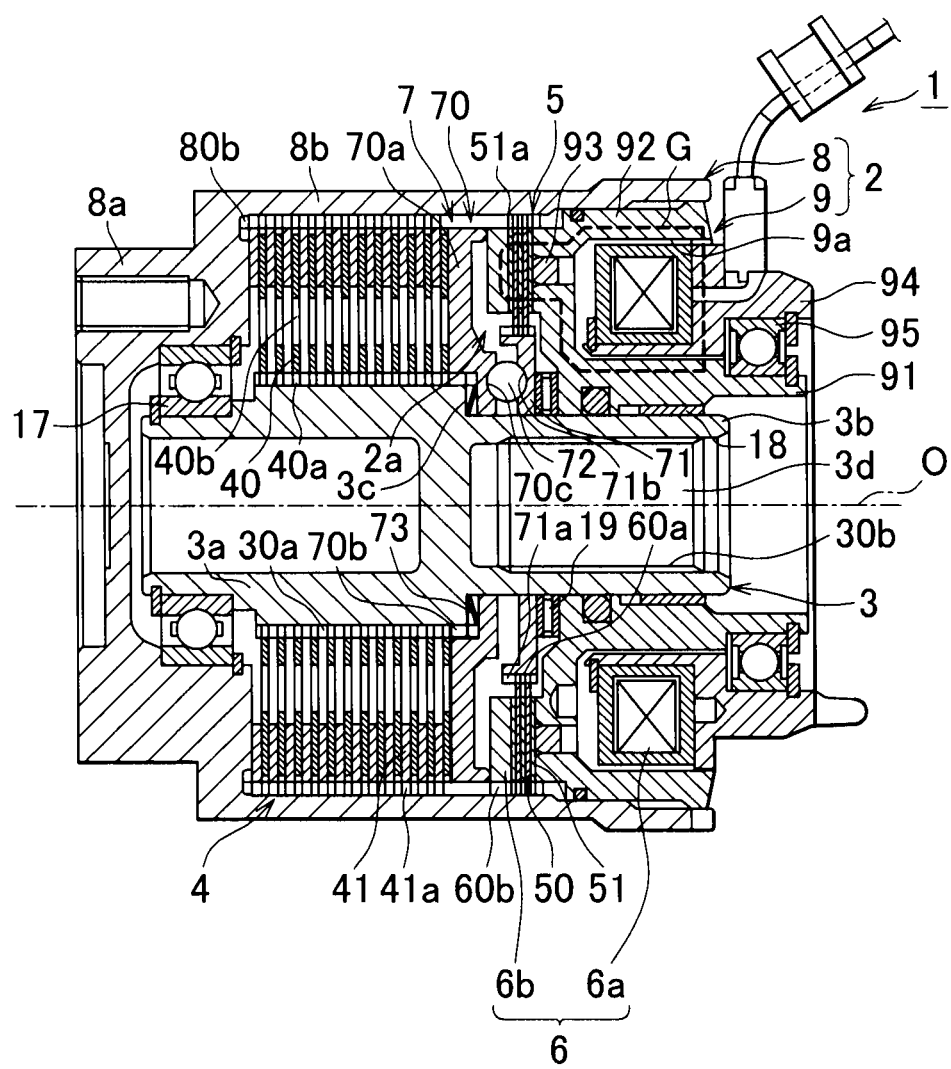
FIG. 2 is a sectional view that shows the overall configuration of a driving force transmission apparatus.
Figure 3A:
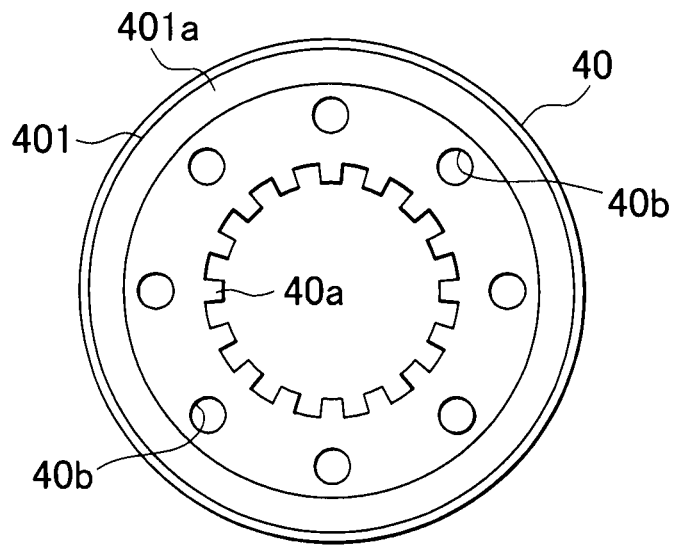
FIG. 3A and FIG. 3B are plain views that show the appearances of clutch plates, where
Figure 3B:
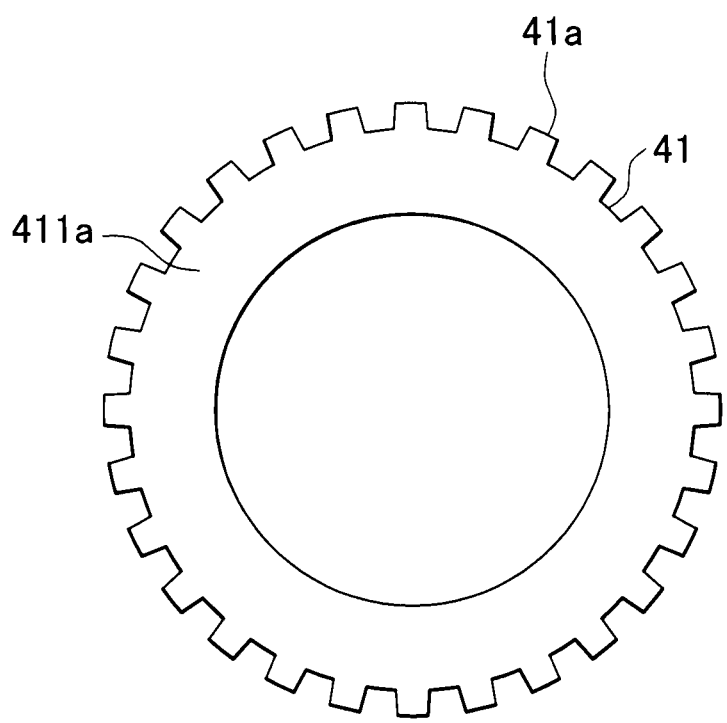

The overall configuration of the driving force transmission apparatus 1 will be described below. FIG. 2 is a sectional view that shows the overall configuration of the driving force transmission apparatus 1. FIG. 3A is a plain view that shows the appearance of each inner clutch plate 40 of the driving force transmission apparatus 1. FIG. 3B is a plain view that shows the appearance of each outer clutch plate 41 of the driving force transmission apparatus 1.

As shown in FIG. 2, the driving force transmission apparatus 1 is formed mainly of a housing 2, an inner shaft 3, a main clutch 4, a pilot clutch 5, a driving mechanism 6, and a cam mechanism 7. The housing 2 is an outer rotating member that is rotatable relative to the differential carrier 106 (see FIG. 1). The inner shaft 3 is an inner rotating member that is rotatable relative to the housing 2. The main clutch 4 is interposed between the inner shaft 3 and the housing 2. The pilot clutch 5 is arranged next to the main clutch 4 along a rotation axis O. The driving mechanism 6 generates pressing force for pressing the pilot clutch 5. Due to the pressing force for pressing the pilot clutch 5, generated by the driving mechanism 6, the cam mechanism 7 converts the rotational force of the housing 2 into pressing force for pressing the main clutch 4.

The configuration of the housing 2 will be described below. As shown in FIG. 2, the housing 2 is formed of a front housing 8 and a rear housing 9. The rear housing 9 is fastened to the front housing 8 by screwing, or the like, so as to be rotatable together with the front housing 8. The housing 2 is accommodated in the differential carrier 106 (see FIG. 1) so as to be rotatable about the rotation axis O that serves as a central axis. An annular accommodating space 2a is formed between the housing 2 and the inner shaft 3. Lubricating oil is sealed in the accommodating space 2a.

The front housing 8 is a single-piece member that includes a disc-shaped bottom portion 8a and a hollow cylindrical portion 8b. The front housing 8 is formed into a closed-end cylindrical member that is open toward the rear housing 9. The front housing 8 is coupled to the engine 102 (see FIG. 1) via the transaxle 103 (see FIG. 1) and the propeller shaft 107 (see FIG. 1). A plurality of spline teeth 80b is formed in the inner peripheral surface of the cylindrical portion 8b. The spline teeth 80b are provided along the rotation axis O. The front housing 8 is configured to rotate about the rotation axis O together with the rear housing 9, upon reception of the driving force of the engine 102 from the propeller shaft 107.

The rear housing 9 is formed by connecting first to third housing elements 91 to 93 by welding, or the like. The rear housing 9 is screwed to the inner peripheral surface of the opening portion of the front housing 8, and is rotatably supported by a yoke 94 via a bearing 95. The rear housing 9 has an annular accommodating space 9a. The accommodating space 9a is open in the same direction as the direction in which the front housing 8 is open. The yoke 94 is fixed to a coupling case within the accommodating space 9a, and is formed of a stepped cylindrical member.

The first housing element 91 is an inner peripheral side member of the rear housing 9, and is formed of a cylindrical member made of magnetic material. The second housing element 92 is an outer peripheral side member of the rear housing 9, and is formed of a cylindrical member made of magnetic material like the first housing element 91. The third housing element 93 is interposed between the first housing element 91 and the second housing element 92. The third housing element 93 is formed of an annular member for coupling housing elements, and the annular member is made of non-magnetic material, such as stainless steel.

The configuration of the inner shaft 3 will be described below. The inner shaft 3 has a large cylindrical portion 3a, a small cylindrical portion 3b and a step portion 3c. The cylindrical portions 3a and 3b are different in outside diameter. The step portion 3c is formed between the cylindrical portions 3a and 3b. The inner shaft 3 is arranged along the rotation axis O of the housing 2. The inner shaft 3 is formed of a cylindrical member that is supported by the housing 2 via bearings 17 and 18 so as to be rotatable relative to the housing 2.

A plurality of spline teeth 30a is formed in the outer peripheral surface of the large-diameter cylindrical portion 3a. The spline teeth 30a are provided along the rotation axis O so as to be exposed to the accommodating space 2a.

An accommodating space 3d is formed on the inner side of the inner peripheral surface of the small-diameter cylindrical portion 3b. The accommodating space 3d accommodates an end portion of the drive pinion shaft 108 (see FIG. 1). A spline fitting portion 30b is formed in the inner peripheral surface of the small-diameter cylindrical portion 3b, that defines the accommodating space 3d. The spline fitting portion 30b is spline-fitted to the outer peripheral surface of the drive pinion shaft 108.

The configuration of the main clutch 4 will be described below. The main clutch 4 includes a wet multiple disk clutch that has a plurality of outer clutch plates 41 (outer friction plates) and a plurality of inner clutch plates 40 (inner friction plates).

The main clutch 4 is accommodated in the accommodating space 2a, and is arranged between the cylindrical portion 8b of the front housing 8 and the cylindrical portion 3a of the inner shaft 3. The main clutch 4 is configured such that inner clutch plates 40 may be frictionally engaged with the corresponding outer clutch plates 41 so that the housing 2 and the inner shaft 3 are connected to each other and torque is transmittable, and such that the friction engagement may be cancelled.

The inner clutch plates 40 and the outer clutch plates 41 each are formed in an annular shape, and are arranged alternately along the rotation axis O such that the side surfaces of the respective clutch plates face each other. The inner clutch plates 40 are movable in the axial direction along the rotation axis O with respect to the inner shaft 3. The outer clutch plates 41 are movable in the axial direction along the rotation axis O with respect to the front housing 8.

As shown in FIG. 2 and FIG. 3A, each inner clutch plate 40 has a plurality of protrusions 40a at its inner peripheral edge portion along the circumferential direction. The protrusions 40a protrude radially inward. An annular friction member 401 is stuck to the outer peripheral portions of the side surfaces of each inner clutch plate 40. A plurality of oil holes 40b is formed on the radially inner side of the friction member 401. Lubricating oil flows through the oil holes 40b. The surface of the friction member 401 is used as a friction surface 401a that slides on a corresponding one of the outer clutch plates 41.

The inner clutch plates 40 are arranged so as to be rotatable together with the inner shaft 3 and are movable in the direction of the rotation axis O when the protrusions 40a are engaged with the spline teeth 30a of the inner shaft 3.

As shown in FIG. 2 and FIG. 3B, each outer clutch plate 41 has a plurality of protrusions 41a at its outer peripheral edge portion. The protrusions 41a are arranged along the circumferential direction. The protrusions 41a protrude radially outward. A region of each outer clutch plate 41, facing the friction surface 401a of the friction member 401 of the corresponding inner clutch plate 40, is used as a friction surface 411a.

The outer clutch plates 41 are arranged so as to be rotatable together with the front housing 8 and are movable in the direction of the rotation axis O when the protrusions 41a are engaged with the spline teeth 80b of the front housing 8.

The configuration of the pilot clutch 5 will be described. As shown in FIG. 2, the pilot clutch 5 has a plurality of inner clutch plates 50 and a plurality of outer clutch plates 51. The inner clutch plates 50 and the outer clutch plates 51 each are formed of an annular friction plate, and may be frictionally engage each other when an armature 6b is moved toward an electromagnetic coil 6a by driving the driving mechanism 6 (described later). The pilot clutch 5 is arranged between the armature 6b and the rear housing 9, and is accommodated in the accommodating space 2a.

The inner clutch plates 50 and the outer clutch plates 51 each are formed in an annular shape, and are arranged alternately along the rotation axis O such that the side surfaces of the respective clutch plates face each other.

Each inner clutch plate 50 has a plurality of protrusions 50a at its inner peripheral edge. The inner clutch plates 50 are coupled to a pilot cam 71 so as to be non-rotatable relative to the pilot cam 71 and axially movable when the protrusions 50a are engaged with spline teeth 71a of the pilot cam 71.

Each outer clutch plate 51 has a plurality of protrusions 51a at its outer peripheral edge. The outer clutch plates 51 are coupled to the front housing 8 so as to be non-rotatable relative to the front housing 8 and axially movable when the protrusions 51a are engaged with the spline teeth 80b.

The configuration of the driving mechanism 6 will be described below. The driving mechanism 6 includes the electromagnetic coil 6a and the armature 6b, and is arranged along the rotation axis O of the housing 2. The driving mechanism 6 is configured to frictionally engage the inner clutch plates 50 of the pilot clutch 5 with the outer clutch plates 51 of the pilot clutch 5 when the armature 6b is moved toward the electromagnetic coil 6a by the electromagnetic force generated by the electromagnetic coil 6a.

The electromagnetic coil 6a is accommodated in the accommodating space 9a of the rear housing 9, and is connected to the yoke 94. As shown by the broken line in FIG. 2, the electromagnetic coil 6a is configured to form a magnetic circuit G over the yoke 94, the pilot clutch 5, the armature 6b, the rear housing 9, and the like, through energization, and to generate electromagnetic force for applying moving force for moving the armature 6b toward the rear housing 9. The inner clutch plates 50 and the outer clutch plates 51 are pressed against each other by the moving force, thereby generating friction force.

The armature 6b has a straight spline fitting portion 60b, which extends along the rotation axis O, at its outer peripheral edge, and is coupled to the front housing 8 so as to be non-rotatable relative to the front housing 8 and axially movable when the straight spline fitting portion 60b is fitted to the spline teeth 80b.

Coil current is supplied from a control device (not shown) to the electromagnetic coil 6a. The density of magnetic flux generated in the magnetic circuit G varies depending on the magnitude of the coil current. As the coil current increases, pressing force with which the armature 6b presses the pilot clutch 5 increases.

The configuration of the cam mechanism 7 will be described. As shown in FIG. 2, the cam mechanism 7 includes an annular main cam 70, the annular pilot cam 71 and spherical cam followers 72. The main cam 70 is a pressing member that rotates upon reception of rotational force from the inner shaft 3. The pilot cam 71 is arranged next to the main cam 70 along the rotation axis O of the housing 2. The cam followers 72 are interposed between the main cam 70 and the pilot cam 71. The cam mechanism 7 is arranged between the main clutch 4 and the rear housing 9, and is accommodated in the accommodating space 2a. The main cam 70 is urged toward the pilot cam 71 by a return spring 73 formed of a diaphragm spring. The return spring 73 is arranged between the main cam 70 and the step portion 3c. The cam mechanism 7 is configured to receive rotational force from the housing 2 through the clutch operation of the pilot clutch 5 and to convert the rotational force to pressing force that becomes clutch force for pressing the main clutch 4.

The main cam 70 has a clutch plate pressing portion 70a. The clutch plate pressing portion 70a receives cam thrust, generated by rotation relative to the pilot cam 71, from the cam followers 72 to press the main clutch 4. The main cam 70 is arranged in the cam mechanism 7 at a position close to the main clutch 4, so as to be movable along the rotation axis O.

The clutch plate pressing portion 70a has a plurality of protrusions 70b at its inner peripheral edge portion. The protrusions 70b protrude radially inward, and are engaged with the spline teeth 30a of the inner shaft 3.

A bearing 19 is interposed between the pilot cam 71 and the first housing element 91 of the rear housing 9. The pilot cam 71 is arranged so as to be rotatable relative to the inner shaft 3.

The pilot cam 71 has the spline teeth 71a at its outer peripheral edge. The spline teeth 71a are arranged along the rotation axis O, and fitted to the protrusions 50a of the inner clutch plates 50 so as to be relatively non-rotatable and axially movable.

A plurality of (for example, six) cam grooves 70c and a plurality of (for example, six) cam grooves 71b are formed in the facing surfaces of the main cam 70 and pilot cam 71, respectively. The cam grooves 70c and 71b each extend in the circumferential direction. The cam grooves 70c and 71b each are formed such that the axial depth is largest at the center portion in the circumferential direction and becomes shallower toward end portion. The cam followers 72 are arranged between the cam grooves 70c and 71b. The cam followers 72 each roll from the center portion (neutral position) of the cam grooves 70c and 71b in the circumferential direction toward one side or the other side in the circumferential direction to thereby separate the main cam 70 from the pilot cam 71 to generate pressing force that becomes clutch force for pressing the main clutch 4.

Figure 4A:
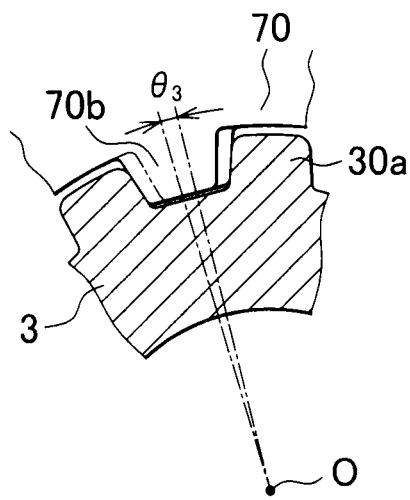
Figure 4B:
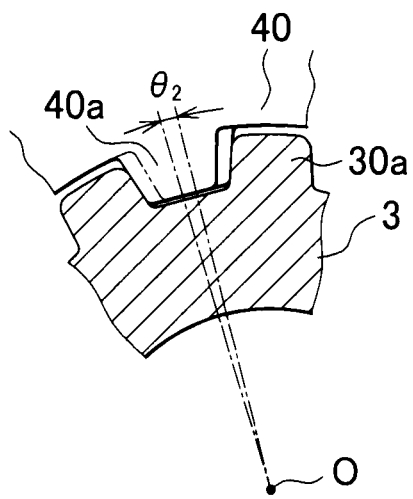
Figure 4C:
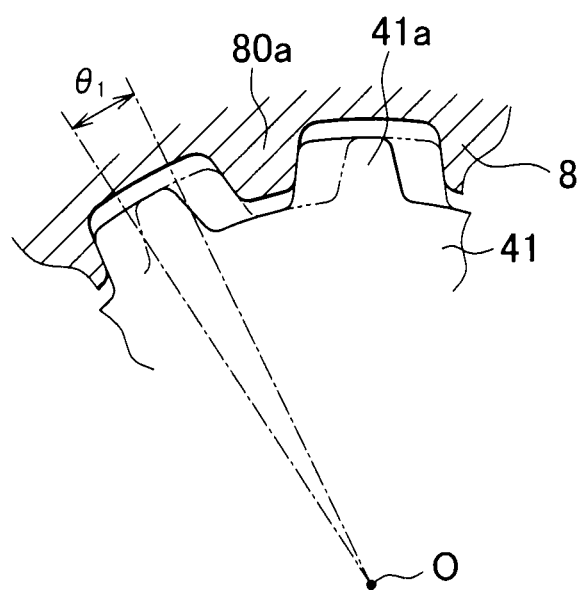

FIG. 4A to FIG. 4C are views that illustrate, engagement portions at which the inner shaft 3 and the front housing 8 are engaged and which are at the inner peripheral portion and outer peripheral portion of the main clutch 4, in cross sections perpendicular to the rotation axis O. FIG. 4A shows an engagement portion at which the inner shaft 3 is engaged with the main cam 70. FIG. 4B shows an engagement portion at which the inner shaft 3 is engaged with the inner clutch plates 40. FIG. 4C shows an engagement portion at which the front housing 8 is engaged with the outer clutch plates 41.

The engagement portion at which the inner shaft 3 is engaged with the main cam 70 will be described below. As shown in FIG. 4A, there is a gap (backlash) in the circumferential direction between each spline tooth 30a of the inner shaft 3 and a corresponding one of the protrusions 70b of the main cam 70. The inner shaft 3 and the main cam 70 are relatively rotatable within an angular range corresponding to the gap. In FIG. 4A, the solid line shows the main cam 70 in a first position that is reached when the main cam 70 is rotated in a first direction (counterclockwise direction) with respect to the inner shaft 3 until the protrusions 70b contact the spline teeth 30a. The alternate long and two short dashes line shows the main cam 70 in a second position that is reached when the main cam 70 is rotated in a second direction (clockwise direction) until the protrusions 70b of the main cam 70 contact the spline teeth 30a of the inner shaft 3.

In FIG. 4A, the central axis of the protrusion 70b of the main cam 70 indicated by the solid line and the central axis of the protrusion 70b of the main cam 70 indicated by the alternate long and two short dashes line both are indicated by the alternate long and short dashes lines. An angle (gap angle) $\theta_3$ made by the central axes of the respective protrusions 70b in the first and second positions is an angle corresponding to the size of a gap in the circumferential direction between each spline tooth 30a of the inner shaft 3 and a corresponding one of the protrusions 70b of the main cam 70. The inner shaft 3 and the main cam 70 are relatively rotatable within the range of the angle $\theta_3$. In the present embodiment, the angle $\theta_3$ is set to 0.53°.

The engagement portion at which the inner shaft 3 is engaged with the inner clutch plate 40 will be described below. As shown in FIG. 4B, there is a gap (backlash) in the circumferential direction between each spline tooth 30a of the inner shaft 3 and a corresponding one of the protrusions 40a of the inner clutch plates 40, and the inner shaft 3 and the inner clutch plates 40 are relatively rotatable within an angular range corresponding to the gap. In FIG. 4B, the solid line shows the inner clutch plates 40 in the case where the inner clutch plates 40 are rotated in the first direction (counterclockwise direction) with respect to the inner shaft 3 until the protrusions 40a contact the spline teeth 30a. In FIG. 4B, the alternate long and two short dashes line shows the inner clutch plates 40 in the case where the inner clutch plates 40 are rotated in the second direction (clockwise direction) until the protrusions 40a of the inner clutch plates 40 contact the spline teeth 30a of the inner shaft 3.

In FIG. 4B, the central axis of the protrusion 40a of the inner clutch plates 40 indicated by the solid line and the central axis of the protrusion 40a of the inner clutch plates 40 indicated by the alternate long and two short dashes line both are indicated by the alternate long and short dashes lines. An angle (gap angle) $\theta_2$ made by the central axes of the respective protrusions 40a in the first and second positions is an angle corresponding to the size of a gap in the circumferential direction between each spline tooth 30a of the inner shaft 3 and a corresponding one of the protrusions 40a of the inner clutch plates 40. The inner shaft 3 and the inner clutch plates 40 are relatively rotatable within the range of the angle $\theta_2$. In the present embodiment, the angle $\theta_2$ is set to 0.56°.

The engagement portion at which the front housing 8 is engaged with the outer clutch plate 41 will be described. As shown in FIG. 4C, there is a gap (backlash) in the circumferential direction between each spline tooth 80b of the front housing 8 and a corresponding one of the protrusions 41a of the outer clutch plates 41, and the front housing 8 and the outer clutch plates 41 are relatively rotatable within an angular range corresponding to the gap. In FIG. 4C, the solid line shows the outer clutch plates 41 in a first position that is reached when the outer clutch plates 41 are rotated in the first direction (counterclockwise direction) with respect to the front housing 8 until the protrusions 41a contact the spline teeth 80b. In FIG. 4C, the alternate long and two short dashes line shows the outer clutch plates 41 in a second position that is reached when the outer clutch plates 41 are rotated in the second direction (clockwise direction) until the protrusions 41a of the outer clutch plates 41 contact the spline teeth 80b of the front housing 8.

In FIG. 4C, the central axis of the protrusion 41a of the outer clutch plates 41 indicated by the solid line and the central axis of the protrusion 41a of the outer clutch plates 41 indicated by the alternate long and two short dashes line both are indicated by the alternate long and short dashes lines. An angle (gap angle) $\theta_1$ made by the central axes of the respective protrusions 41a in the first and second positions is an angle corresponding to the size of a gap in the circumferential direction between each spline tooth 80b of the front housing 8 and a corresponding one of the protrusions 41a of the outer clutch plates 41. The front housing 8 and the outer clutch plates 41 are relatively rotatable within the range of the angle $\theta_1$. In the present embodiment, $\theta_1$ is set to 2.06°.

In the present embodiment, the driving force transmission apparatus 1 is configured such that $\theta_3$ is substantially equal to $\theta_2$ (the difference between $\theta_3$ and $\theta_2$ is smaller than or equal to 0.03°), the angle $\theta_1$ is larger than the angle $\theta_2$ and the sum $(\theta_1+\theta_2)$ of the angle $\theta_1$ and the angle $\theta_2$ is larger by 1.0° or above than the angle $\theta_3$. That is, the inner shaft 3, the front housing 8, the main cam 70, the inner clutch plates 40 and the outer clutch plates 41 are configured such that the relationship $\theta_1+\theta_2-\theta_3 \geq 1.0°$ is satisfied.

Figure 5A:
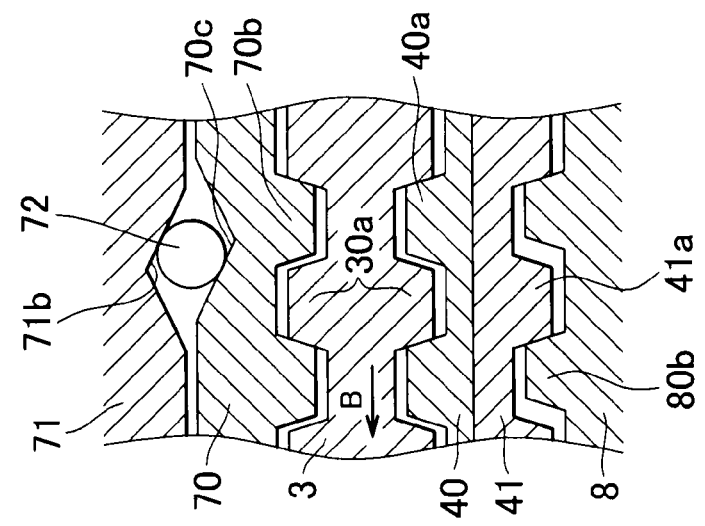
FIG. 5A to FIG. 5C are views that schematically illustrate movements of members when differential rotation between the inner shaft and the front housing is reversed, where
Figure 5B:
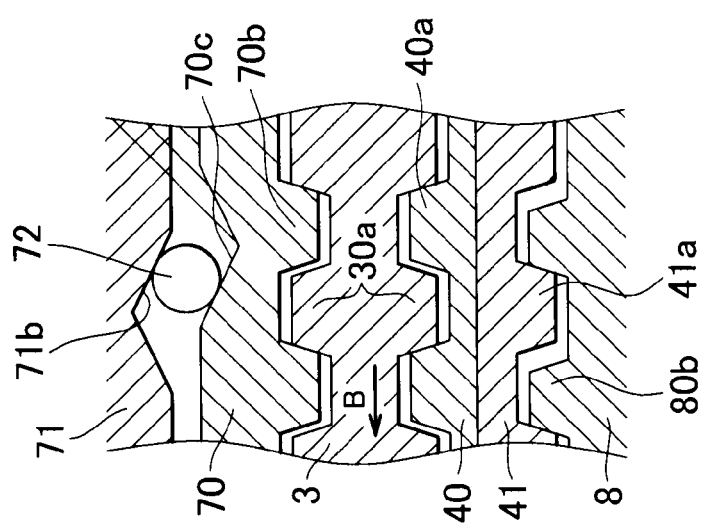
Figure 5C:
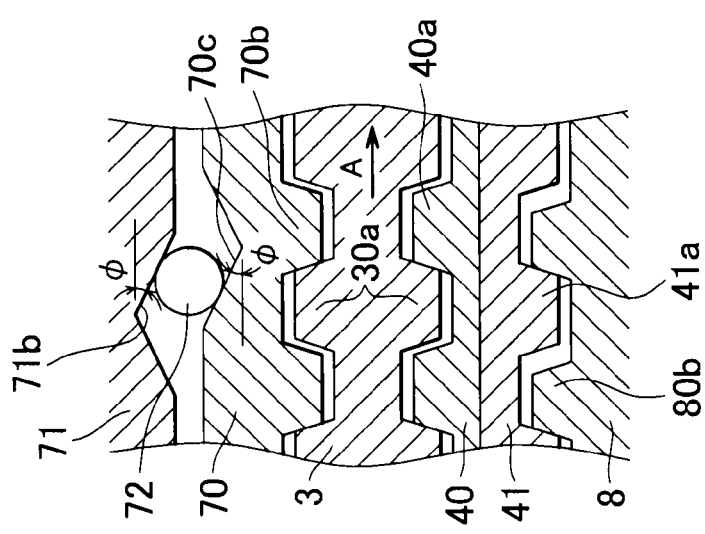

Operations and effects of the first embodiment will be described below. FIG. 5A to FIG. 5C are views that schematically illustrate movements of members when differential rotation between the inner shaft 3 and the front housing 8 is reversed. Such a reverse state occurs, for example, when the four-wheel drive vehicle 101 shifts from straight traveling to turning and then the mean rotation speed of the rear wheels 105 becomes higher than the mean rotation speed of the front wheels 104.

FIG. 5A shows a torque transmission state where torque in such a direction that rotation relative to the inner shaft 3 is suppressed, is applied to the pilot cam 71 through clutch operation of the pilot clutch 5 and torque in such a direction that the inner shaft 3 rotates in an arrow A direction, is applied to the front housing 8.

In this torque transmission state, the spline teeth 30a of the inner shaft 3 contact the protrusions 70b of the main cam 70 in the arrow A direction, and torque that causes the main cam 70 to rotate relative to the pilot cam 71 is applied to the main cam 70. Thus, the cam follower 72 interposed between each cam groove 71b of the pilot cam 71 of the cam mechanism 7 and a corresponding one of the cam grooves 70c of the main cam 70 of the cam mechanism 7 rolls from the neutral position, so the main cam 70 is separated from the pilot cam 71 in the axial direction, and the clutch plate pressing portion 70a of the main cam 70 applies pressing force to the main clutch 4.

In the driving force transmission apparatus 1 according to the present embodiment, an inclination angle (cam angle) φ of an inclined surface of each cam groove 71b of the pilot cam 71 and an inclination angle (cam angle) φ of an inclined surface of each cam groove 70c of the main cam 70, on which the cam follower 72 rolls, with respect to the circumferential direction are set to 8.0°.

The spline teeth 30a of the inner shaft 3 contact the protrusions 40a of the inner clutch plates 40 in the arrow A direction, and the protrusions 41a of the outer clutch plates 41 contact the spline teeth 80b of the front housing 8 in the arrow A direction to thereby transmit torque between the front housing 8 and the inner shaft 3 via the main clutch 4.

FIG. 5B shows an initial reverse state when torque applied to the inner shaft 3 is reversed from the state shown in FIG. 5A and then torque in such a direction that the inner shaft 3 rotates relative to the front housing 8 in an arrow B direction (direction opposite to the arrow A direction) is applied to the front housing 8.

When the differential rotation state between the inner shaft 3 and the front housing 8 is reversed, as shown in FIG. 5B, the spline teeth 30a of the inner shaft 3 contact the protrusions 70b of the main cam 70 in the arrow B direction, and the spline teeth 30a of the inner shaft 3 contact the protrusions 40a of the inner clutch plates 40 in the arrow B direction.

In this initial reverse state, the phase of relative rotation between the main cam 70 and the pilot cam 71 is the same as that in the torque transmission state shown in FIG. 5A, and the clutch plate pressing portion 70a of the main cam 70 applies pressing force to the main clutch 4. However, the protrusions 41a of the outer clutch plates 41 have not contacted the spline teeth 80b of the front housing 8 in the arrow B direction yet, so torque is not transmitted between the front housing 8 and the inner shaft 3 via the main clutch 4.

When the inner shaft 3 further differentially rotates relative to the front housing 8 in the arrow B direction from the state shown in FIG. 5B, as shown in FIG. 5C, the protrusions 41a of the outer clutch plates 41 contact the spline teeth 80b of the front housing 8 in the arrow B direction.

In addition, in process of shifting from the state shown in FIG. 5B to the state shown in FIG. 5C, each cam follower 72 rolls in the cam groove 71b of the pilot cam 71 and the cam groove 70c of the main cam 70 toward the neutral position, and the distance between the main cam 70 and the pilot cam 71 reduces. Thus, pressing force with which the clutch plate pressing portion 70a of the main cam 70 presses the main clutch 4 is reduced. That is, at the time when the protrusions 41a of the outer clutch plate 41 contact the spline teeth 80b of the front housing 8 in the arrow B direction, pressing force for pressing the main clutch 4 has been already reduced.

The driving force transmission apparatus 1 is configured such that the relationship $\theta_1+\theta_2-\theta_3 \geq 1.0°$ is satisfied, so the main cam 70 and the pilot cam 71 relatively rotate 1.0° or above (in the present embodiment, 2.09° $(=\theta_1+\theta_2-\theta_3)$) during a period from the initial reverse state shown in FIG. 5B to the state shown in FIG. 5C, and, in a state where pressing force for pressing the main clutch 4 is reduced by a rate corresponding to this angle, the protrusions 41a of the outer clutch plate 41 contact the spline teeth 80b of the front housing 8 in the arrow B direction.

Thus, a steep change in torque transmission amount between the inner shaft 3 and the front housing 8 when differential rotation between the inner shaft 3 and the front housing 8 is reversed is suppressed and, consequently, generation of abnormal noise is suppressed.

When the inner shaft 3 further differentially rotates relative to the front housing 8 in the arrow B direction from the state shown in FIG. 5C, each cam follower 72 rolls onto an opposite inclined surface of the cam groove 71b of the pilot cam 71 and an opposite inclined surface of the cam groove 70c of the main cam 70 with respect to the neutral position to separate the main cam 70 from the pilot cam 71. Thus, the driving force transmission apparatus 1 enters a torque transmission state where torque is transmitted between the inner shaft 3 and the front housing 8 via the main clutch 4.

Figure 6A:
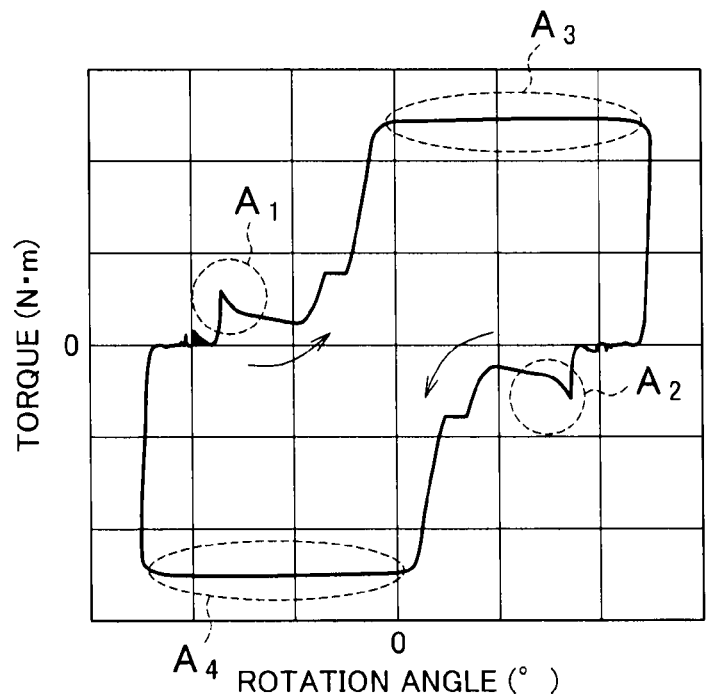
FIG. 6A and FIG. 6B are graphs that show the correlations between a rotation angle of the front housing and a transmission torque when the front housing is rotated back and forth, where
Figure 6B:
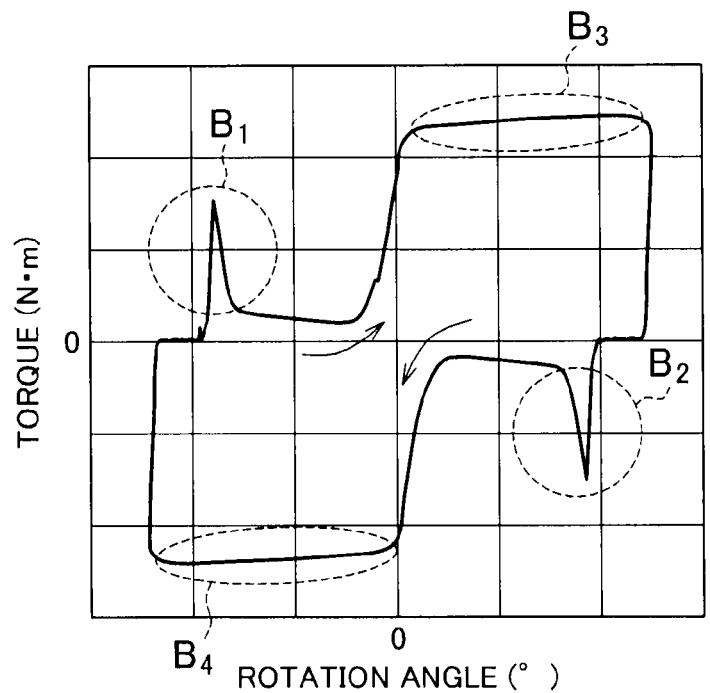

FIG. 6A and FIG. 6B are graphs that show the correlations between a rotation angle of the front housing 8 and a torque transmitted to the inner shaft 3 when rotation resistance is applied to the inner shaft 3 by a brake device and the front housing 8 is rotated back and forth across an original position regarding the rotation angle (position at which the rotation angle is 0°). FIG. 6A shows the results when the driving force transmission apparatus 1 according to the present embodiment is used. FIG. 6B shows the results when a driving force transmission apparatus in which $\theta_1$, $\theta_2$ and $\theta_3$ are set such that $\theta_1+\theta_2-\theta_3$ is an angle smaller than 1.0° (0.46°) is used as a comparative example.

In the case where the driving force transmission apparatus 1 according to the present embodiment is used, as shown in FIG. 6A, when the rotation direction of the front housing 8 is reversed and the front housing 8 is rotated about 1.0°, transmitted torque temporarily increases as indicated by the broken lines $A_1$ and $A_2$; however, the amount of increase is smaller than or equal to one third of the torque in the torque transmission states indicated by the broken lines $A_3$ and $A_4$, so generation of abnormal noise is suppressed.

On the other hand, in the case where the driving force transmission apparatus in which $\theta_1+\theta_2-\theta_3$ is smaller than 1.0° is used, as indicated by the broken lines $B_1$ and $B_2$ in FIG. 6B, the amount of temporary increase in torque when the rotation direction of the front housing 8 is reversed is larger than that in the case shown in FIG. 6A. The amount of increase is about 80% of the torque in the torque transmission states indicated by the broken lines $B_3$ and $B_4$, and torque steeply reduces immediately after the torque steeply increases. In the case where such a driving force transmission apparatus is applied to the four-wheel drive vehicle 101, torque transmitted toward the rear wheels 105 when differential rotation is reversed significantly changes in a short period of time, so impact and abnormal noise that are large enough for the occupant to notice occur.

A temporary increase in transmission torque when differential rotation is reversed is desirably smaller than or equal to half the maximum value of transmission torque in the torque transmission state. Where $\theta_1+\theta_2-\theta_3 \geq 1.0°$, a temporary increase in torque when differential rotation is reversed may be smaller than or equal to half the maximum value of transmission torque in the torque transmission state.

Where $\theta_0=\theta_1+\theta_2-\theta_3$ and the cam angle is $\phi$), it is desirable that $\theta_0 \geq 0.141/\tan \phi$), and it is more desirable that $\theta_0 \geq 0.214/\tan \phi$). When the relationship $\theta_0 \geq 0.141/\tan \phi$) is satisfied, a temporary increase in torque when differential rotation is reversed may be smaller than or equal to half the maximum value of transmission torque in the torque transmission state. When the relationship $\theta_0 \geq 0.214/\tan \phi$) is satisfied, a temporary increase in torque when differential rotation is reversed may be further reduced.

Effects of the first embodiment will be described below. According to the above-described first embodiment, the following effects may be obtained.

(1) The driving force transmission apparatus 1 is configured such that the inequality $\theta_1+\theta_2-\theta_3 \geq 1.0°$ is satisfied, so a temporary steep increase in transmission torque that occurs due to remaining cam thrust when differential rotation between the front wheel side member (front housing 8) and the rear wheel side member (inner shaft 3) is reversed is suppressed to thereby make it possible to reduce impact and abnormal noise.

(2) Furthermore, the driving force transmission apparatus 1 is configured such that the inequality $\theta_1+\theta_2-\theta_3 \geq 1.0°$ is satisfied by making $\theta_2$ substantially equal to $\theta_3$ and making $\theta_1$ larger than $\theta_2$. Therefore, even when the circumferential width of each protrusion 40a of the inner clutch plates 40 is not substantially smaller than the circumferential width of each protrusion 70b of the main cam 70, it is possible to reduce impact and abnormal noise when differential rotation is reversed. In addition to the configuration according to the embodiment, when the circumferential width of each protrusion 40a of the inner clutch plates 40 is smaller than the circumferential width of each protrusion 70b of the main cam 70, it is, of course, possible to obtain the further large effect of reducing abnormal noise, or the like.

Next, a second embodiment of the invention will be described with reference to FIG. 7 and FIG. 8. Note that, in these drawings, like reference numerals denote components having similar configurations and functions to those of the first embodiment, and the description thereof is omitted. In addition, in the following description, the "right side" and the "left side" respectively mean a right side and a left side with respect to the traveling direction of a vehicle.

Figure 7:
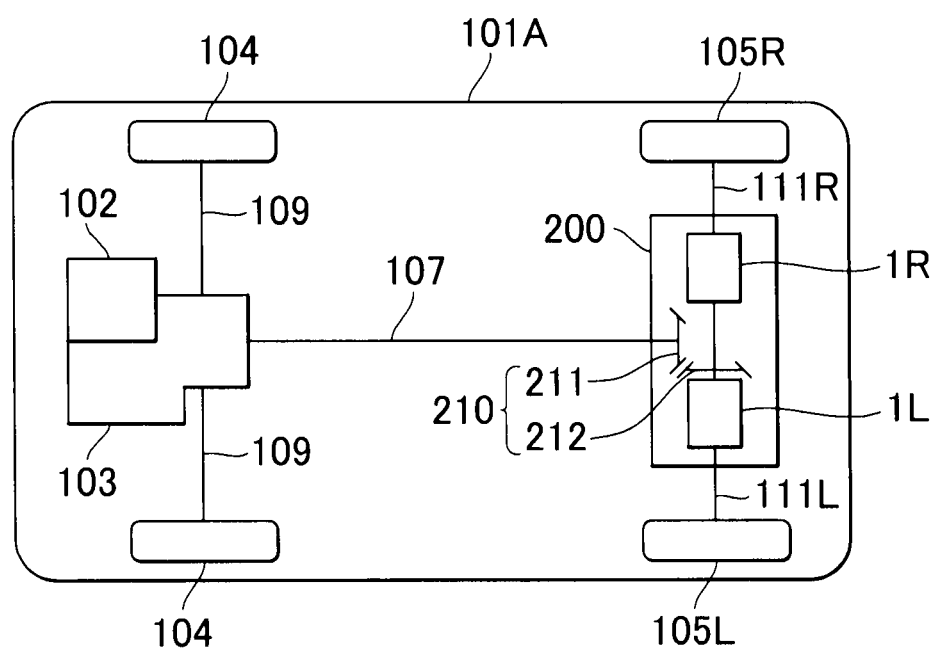
FIG. 7 is a schematic view that shows the configuration of a four-wheel drive vehicle according to a second embodiment of the invention.

FIG. 7 is a schematic view that shows a configuration example of a four-wheel drive vehicle according to the second embodiment of the invention. Like the four-wheel drive vehicle 101 according to the first embodiment, the four-wheel drive vehicle 101A according to the present embodiment includes an engine 102 and a transaxle 103. A driving force transmission system is configured to transmit torque, output from the transaxle 103, to a pair of front wheels 104 via a pair of front axle shafts 109 and to a pair of rear wheels 105R and 105L via a propeller shaft 107. However, the configuration of the driving force transmission system between the propeller shaft 107 and the rear wheels 105R and 105L differs from that of the first embodiment.

The driving force transmission system of the four-wheel drive vehicle 101A includes a gear mechanism 210 and a pair of driving force transmission apparatuses 1R and 1L. The gear mechanism 210 is accommodated in a carrier 200 arranged on the rear wheel side. The driving force transmission apparatuses 1R and 1L are provided on the torque transmission downstream side of the gear mechanism 210.

The gear mechanism 210 includes an input gear 211 and an output gear 212. The input gear 211 is formed of a bevel gear. The output gear 212 is formed of a bevel gear. The input gear 211 is provided at the end portion of the propeller shaft 107 so as to rotate together with the propeller shaft 107. The output gear 212 is in mesh with the input gear 211. Then, the gear mechanism 210 is configured to output the torque of the engine 102, input into the input gear 211 via the propeller shaft 107, to the driving force transmission apparatuses 1R and 1L from the output gear 212. That is, the gear mechanism 210 distributes the input torque to the driving force transmission apparatuses 1R and 1L.

The driving force transmission apparatuses 1R and 1L each have a similar configuration to that of the driving force transmission apparatus 1 according to the first embodiment. The right-side driving force transmission apparatus 1R transmits torque from the output gear 212 to a rear axle shaft 111R coupled to the right rear wheel 105R such that the amount of transmitted torque is variable. In addition, the left-side driving force transmission apparatus 1L transmits torque from the output gear 212 to a rear axle shaft 111L coupled to the left rear wheel 105L such that the amount of transmitted torque is variable. The amount of torque transmitted by each of the driving force transmission apparatus 1R and the driving force transmission apparatus 1L is controllable by a control device (not shown).

Figure 8:
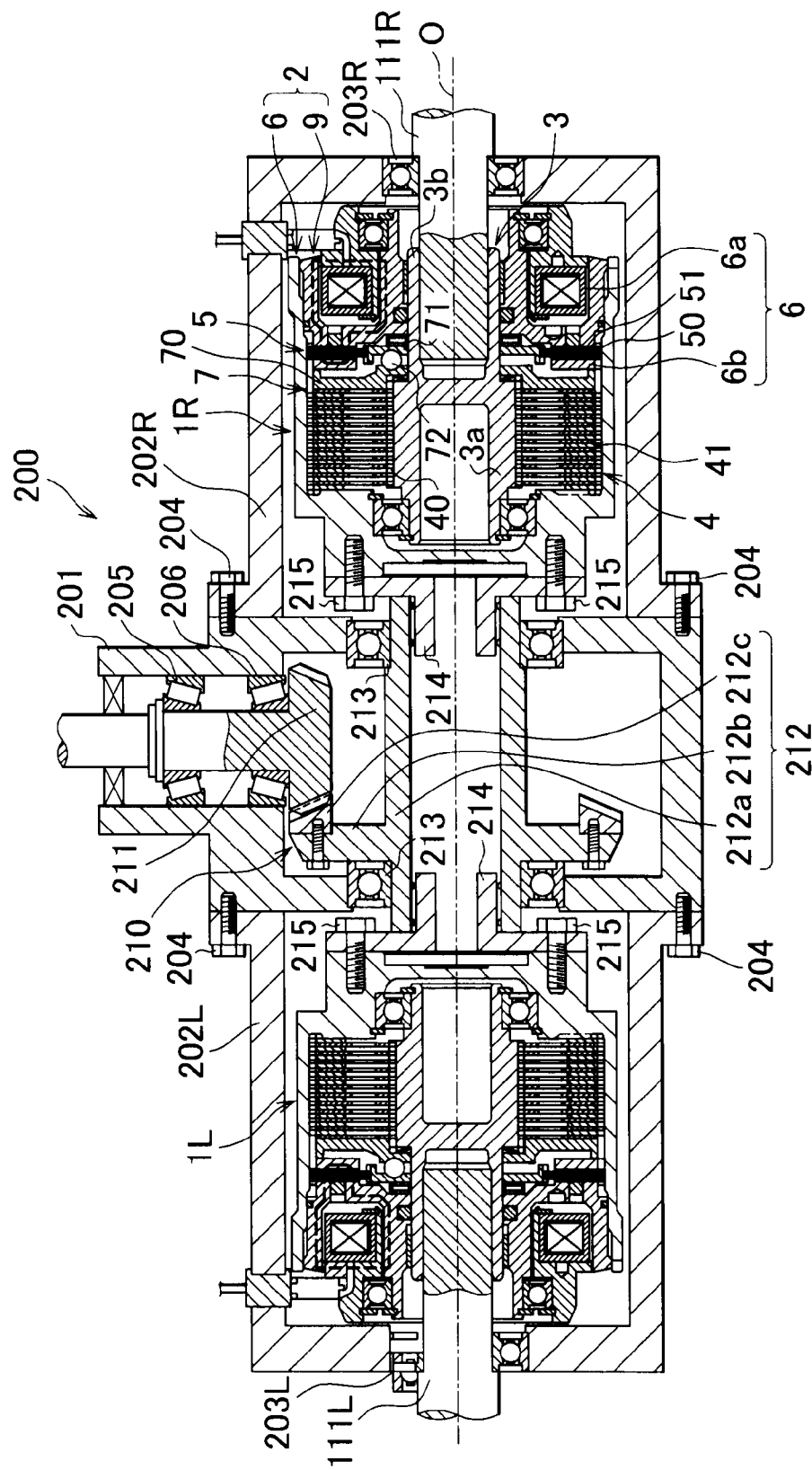
FIG. 8 is a sectional view that shows a schematic configuration example of a gear mechanism and a driving force transmission apparatuses according to the second embodiment of the invention.

FIG. 8 is a sectional view that shows a schematic configuration example of the carrier 200 and the inside of the carrier 200. The carrier 200 is formed by fixing a center carrier 201 and side carriers 202R and 202L respectively arranged on the right side and left side of the center carrier 201 to each other with a plurality of bolts 204.

The gear mechanism 210 and the driving force transmission apparatuses 1R and 1L are rotatably arranged in the carrier 200. The gear mechanism 210 is formed by causing the input gear 211 and the output gear 212 to mesh with each other. The driving force transmission apparatuses 1R and 1L are respectively arranged on the right side and left side of the gear mechanism 210.

The input gear 211 is supported by tapered roller bearings 205 and 206 provided on the inner surface of a cylindrical opening portion formed in the center carrier 201, and rotates upon reception of the torque of the engine 102, transmitted through the propeller shaft 107.

The output gear 212 is supported by ball bearings 213 provided at the center carrier 201 such that the gear axis of the output gear 212 is perpendicular to the gear axis of the input gear 211. The output gear 212 has a hollow cylindrical portion 212a, a disc-shaped protruding portion 212b and a gear portion 212c. The cylindrical portion 212a extends in a vehicle widthwise direction. The protruding portion 212b protrudes radially outward from the cylindrical portion 212a. The gear portion 212c is provided at an end portion of the protruding portion 212b, and has gear teeth that are in mesh with the input gear 211. These portions are configured to rotate together with each other by fixing means, such as bolt fastening.

Flanges 214 are fixed at the right-side and left-side end portions of the cylindrical portion 212a. The flanges 214 serve as coupling members that couple the output gear 212 to the respective housings 2 of the driving force transmission apparatuses 1R and 1L such that the output gear 212 and the housings 2 are non-rotatable relative to each other. In the present embodiment, axially protruding shaft portions formed at the center portions of the flanges 214 are spline-fitted to the inner surface of the cylindrical portion 212a through press-fitting to thereby fix the flanges 214 to the output gear 212 such that the flanges 214 and the output gear 212 are non-rotatable relative to each other.

The flange 214 fixed to the right end portion of the output gear 212 is coupled to the housing 2 of the right-side driving force transmission apparatus 1R with a plurality of bolts 215 such that the flange 14 and the housing 2 are non-rotatable relative to each other. In addition, the end portion of the right-side rear axle shaft 111R is spline-fitted into the small-diameter cylindrical portion 3b of the inner shaft 3 of the driving force transmission apparatus 1R. The rear axle shaft 111R is rotatably supported by a ball bearing 203R provided at the side carrier 202R.

Similarly, the flange 214 fixed to the left end portion of the output gear 212 is coupled to the housing 2 of the left-side driving force transmission apparatus 1L such that the flange 214 and the housing 2 and the flange 214 are non-rotatable relative to each other, and the end portion of the left-side rear axle shaft 111L is spline-fitted to the inner shaft 3. The rear axle shaft 111L is rotatably supported by a ball bearing 203L provided at the side carrier 202L.

In this way, the output gear 212, the housing 2 of the driving force transmission apparatus 1R and the housing 2 of the driving force transmission apparatus 1L are coupled to one another so as to be relatively non-rotatable, and are configured to rotate about the common rotation axis O.

When no coil current is supplied to the electromagnetic coil 6a of each of the driving force transmission apparatuses 1R and 1L, the vehicle is driven in a two-wheel drive mode in which the torque of the engine 102 is not transmitted to the axle shaft 111R or 111L and the torque of the engine 102 is transmitted only to the front wheels 104. When coil current is supplied to the electromagnetic coil 6a of each of the driving force transmission apparatuses 1R and 1L, the vehicle is driven in a four-wheel drive mode in which the torque of the engine 102 is transmitted to the axle shafts 111R and 111L and the front wheels 104 and the rear wheels 105R and 105L are driven.

The torque transmitted from the output gear 212 to the right rear wheel 105R is adjustable by the driving force transmission apparatus 1R. The torque transmitted from the output gear 212 to the left rear wheel 105L is adjustable by the driving force transmission apparatus 1L. More specifically, pressing force with which the armature 6b presses the pilot clutch 5 varies depending on the magnitude of coil current supplied to the electromagnetic coil 6a of the driving force transmission apparatus 1R or 1L. Thus, rotation force that relatively rotates the main cam 70 and pilot cam 71 of the cam mechanism 7 changes. That is, the cam thrust of the cam mechanism 7, which becomes pressing force for pressing the main clutch 4, varies depending on coil current supplied to the electromagnetic coil 6a, and torque transmitted from the housing 2 to the inner shaft 3 changes.

In addition, when the vehicle is turning, a larger torque is distributed to the outer wheel from among the rear wheels 105R and 105L to thereby allow the vehicle to easily and stably turn.

Operations and effects of the second embodiment will be described. When the four-wheel drive vehicle 101A accelerates or runs at a constant speed while moving straight ahead, torque is transmitted from the housing 2 of each of the driving force transmission apparatuses 1R and 1L to the inner shaft 3. At this time, the main cam 70, the inner shaft 3, the inner clutch plates 40, the outer clutch plates 41 and the outer housing 8 are, for example, engaged in the state shown in FIG. 5A. When the four-wheel drive vehicle 101A turns to the left from this state, the right rear wheel 105R rotates at a higher speed than the left rear wheel 105L, so the inner shaft 3 rotates at a higher speed than the housing 2 in the driving force transmission apparatus 1R. As a result, differential rotation between the housing 2 and inner shaft 3 of the driving force transmission apparatus 1R is reversed, and the members are, for example, engaged in the initial reverse state shown in FIG. 5B and then enter the reverse state shown in FIG. 5C.

Then, as described in the first embodiment, when the driving force transmission apparatus is not configured such that the inequality $\theta_1+\theta_2-\theta_3 \geq 1.0°$ is satisfied, impact and abnormal noise large enough for a passenger to notice occur due to a steep change in transmission torque; however, the driving force transmission apparatus 1R according to the present embodiment is configured such that the inequality $\theta_1+\theta_2-\theta_3 \geq 1.0°$ is satisfied, so impact and abnormal noise are reduced.

On the other hand, similarly, when the four-wheel drive vehicle 101A turns to the right, impact and abnormal noise due to reversal of differential rotation in the driving force transmission apparatus 1L are reduced.

In the thus configured four-wheel drive vehicle 101A according to the present embodiment, the driving force transmission apparatuses 1R and 1L are respectively provided so as to correspond to the right and left rear wheels 105R and 105L, so reversal of differential rotation during turning occurs easily as compared with the four-wheel drive vehicle 101 according to the first embodiment. In other words, even when the steered angle of the front wheels 104 is small, differential rotation between the housing 2 and the inner shaft 3 is reversed, so differential rotation may be reversed, for example, when the vehicle changes a lane as well. That is, reversal of differential rotation can frequently occur while the vehicle is travelling; however, in the four-wheel drive vehicle 101A according to the present embodiment, impact and abnormal noise at the time of reversal of differential rotation are reduced as described above. This prevents a passenger from experiencing discomfort or uneasy feeling.

Next, a third embodiment of the invention will be described with reference to FIG. 9. Note that, in the drawing, like reference numerals denote components having similar configurations and functions to those of the first embodiment, and the description thereof is omitted.

In the first embodiment, the spline teeth 30a provided on the outer peripheral surface of the large-diameter cylindrical portion 3a of the inner shaft 3 are formed from one end portion to the other end portion in the direction of the rotation axis O. The spline teeth 30a have the same facewidth and pitch. The present embodiment differs from the first embodiment in that the spline teeth 30a are formed of a plurality of teeth that are different in at least one of facewidth and pitch.

Figure 9:
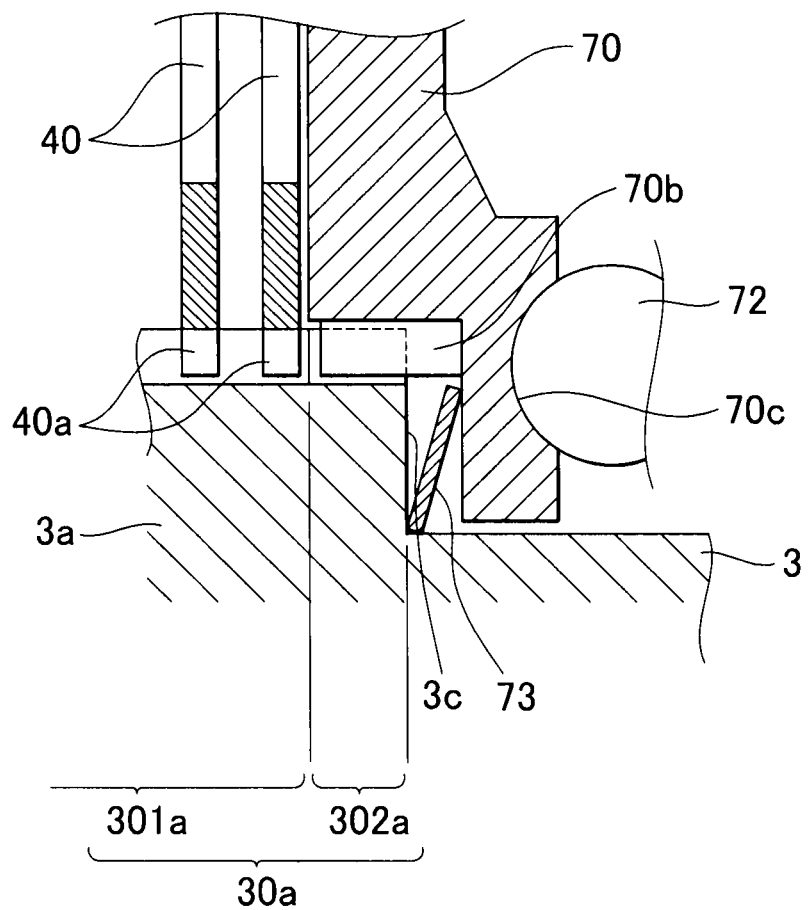
FIG. 9 is an enlarged view of a main portion that shows a configuration example of a driving force transmission apparatus according to a third embodiment of the invention.

FIG. 9 is an enlarged view of a main portion that shows an engagement portion at which the main cam 70 is engaged with the inner shaft 3, and its surrounding portion in the present embodiment.

As shown in FIG. 9, the spline teeth 30a have first teeth 301a and second teeth 302a. The first teeth 301a are formed on the bottom portion 8a-side of the front housing 8. The second teeth 302a are formed on the main cam 70-side. The protrusions 40a of the inner clutch plates 40 are engaged with the first teeth 301a, and the protrusions 70a of the main cam 70 are engaged with the second teeth 302a. Thus, the rotation of the inner clutch plates 40 relative to the inner shaft 3 and the rotation of the main cam 70 relative to the inner shaft 3 are restricted, but the inner clutch plate 40 and the main cam 70 are movable in the axial direction.

The facewidth and the circumferential pitch of the first teeth 301a and the second teeth 302a are set such that engagement of the inner clutch plates 40 and the main cam 70 are appropriately performed. More specifically, for example, the circumferential width of each second tooth 302a is larger than the circumferential width of each first tooth 301a. Thus, $\theta_3$ is smaller than $\theta_2$, so the driving force transmission apparatus may be configured such that the inequality $\theta_1+\theta_2-\theta_3 \geq 1.0°$ is satisfied.

The driving force transmission apparatus according to the invention is described on the basis of the above embodiments; however, the invention is not limited to the embodiments described above. The invention may be implemented in various forms without departing from the scope of the invention. For example, the invention may be implemented in the following alternative embodiments.

(1) In the above embodiments, the driving mechanism 6 having the electromagnetic coil 6a and the armature 6b is used to frictionally engage the pilot clutch 5, and torque transmitted by the pilot clutch 5 is used to rotate the main cam 70 and the pilot cam 71 relative to each other; however, the invention is not limited to this configuration. There may be employed a configuration in which an armature cam that has both the function of a pilot cam and the function of an armature is provided and no pilot clutch 5 is provided.

(2) In the first embodiment, the housing 2 is coupled to the propeller shaft 107 on the front wheel side, and the inner shaft 3 is coupled to the drive pinion shaft 108 on the rear wheel side; however, the invention is not limited to this configuration. For example, the inner shaft 3 may be coupled to the propeller shaft 107 on the front wheel side, and the housing 2 may be coupled to the drive pinion shaft 108 on the rear wheel side.

(3) In the first embodiment, the driving force transmission apparatus 1 is accommodated in the differential carrier 106; however, the arrangement position of the driving force transmission apparatus 1 is not limited to this position. For example, the driving force transmission apparatus 1 may be arranged in the transaxle 103.

(4) In the second embodiment, the four-wheel drive vehicle 101A includes the front wheels 104 serving as main driving wheels to which the torque of the engine 102 is constantly transmitted and the rear wheels 105R and 105L serving as auxiliary driving wheels to which the torque of the engine 102 is transmitted where necessary, and the driving force transmission apparatuses 1R and 1L are respectively provided so as to correspond to the rear wheels 105R and 105L; however, the invention is not limited to this configuration. For example, a vehicle may be configured as a two-wheel drive vehicle (FF vehicle) in which two driving force transmission apparatuses according to the invention are respectively provided so as to correspond to right and left front wheels and torque is not transmitted to the rear wheels. In the thus configured vehicle as well, as in the case of the second embodiment, it is possible to suppress impact and abnormal noise due to reversal of differential rotation at the time of turning, or the like.

According to the invention, it is possible to suppress generation of abnormal noise even when the circumferential width of each protrusion of inner clutch plates spline-fitted to an inner rotating member is not smaller than the circumferential width of each protrusion of a second cam member.

What is claimed is:

1. A driving force transmission apparatus, comprising:
an outer rotating member that has a plurality of first spline teeth on its inner peripheral surface, the first spline teeth extending in a direction of a rotation axis;
an inner rotating member that is provided radially inward of the outer rotating member, that is supported coaxially with the outer rotating member so as to be rotatable relative to the outer rotating member, and that has a plurality of second spline teeth on its outer peripheral surface, the second spline teeth extending in the direction of the rotation axis;
a plurality of outer friction plates each having a plurality of first protrusions at its outer peripheral portion, the first protrusions engaging with the first spline teeth;
a plurality of inner friction plates which are arranged alternately with the outer friction plates, and each of the plurality of inner friction plates has a plurality of second protrusions at its inner peripheral portion, the second protrusions engaging with the second spline teeth; and
a pressing member that is arranged on one axial side of the outer friction plates and the inner friction plates, that has a plurality of third protrusions at its inner peripheral portion, the third protrusions engaging with the second spline teeth, and that axially moves along the second spline teeth to press the outer friction plates and the inner friction plates to thereby frictionally engage the outer friction plates with the inner friction plates, wherein
where a gap angle in a circumferential direction between each of the first spline teeth of the outer rotating member and a corresponding one of the first protrusions of the outer friction plates is $\theta_1$, a gap angle in the circumferential direction between each of the second spline teeth of the inner rotating member and a corresponding one of the second protrusions of the inner friction plates is $\theta_2$ and a gap angle in the circumferential direction between each of the second spline teeth of the inner rotating member and a corresponding one of the third protrusions of the pressing member is $\theta_3$, the inequality, $\theta_1+\theta_2-\theta_3>1.0°$, is satisfied.

2. The driving force transmission apparatus according to claim 1, wherein $\theta_1>\theta_2$.

3. A vehicle comprising:
a pair of the driving force transmission apparatuses according to claim 1;
a driving source that generates torque used as driving force for propelling the vehicle; and
a gear mechanism that has an input gear to which the torque of the driving source is input, and an output gear that outputs the torque input in the input gear to each of the driving force transmission apparatuses, wherein
a driving force transmission system is configured so as to transmit torque from the output gear to a left-side wheel via one of the driving force transmission apparatuses and to transmit torque from the output gear to a right-side wheel via the other one of the driving force transmission apparatuses.

4. A vehicle comprising:
- a pair of the driving force transmission apparatuses according to claim 2;
- a driving source that generates torque used as driving force for propelling the vehicle; and
- a gear mechanism that has an input gear to which the torque of the driving source is input, and an output gear that outputs the torque input in the input gear to each of the driving force transmission apparatuses, wherein
- a driving force transmission system is configured so as to transmit torque from the output gear to a left-side wheel via one of the driving force transmission apparatuses and to transmit torque from the output gear to a right-side wheel via the other one of the driving force transmission apparatuses.

* * * * *